United States Patent
Saxena et al.

(10) Patent No.: US 10,699,232 B1
(45) Date of Patent: Jun. 30, 2020

(54) SYSTEM, METHOD, AND COMPUTER PROGRAM FOR RESOLVING PRODUCTION BUSINESS ISSUES ASSOCIATED WITH A SOFTWARE PRODUCT

(71) Applicant: Amdocs Development Limited, Limassol (CY)

(72) Inventors: Dimna Saxena, Pune (IN); Saurabh Gour, Pune (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 547 days.

(21) Appl. No.: 15/456,302

(22) Filed: Mar. 10, 2017

Related U.S. Application Data

(60) Provisional application No. 62/306,584, filed on Mar. 10, 2016.

(51) Int. Cl.
   *G06Q 10/06* (2012.01)
   *G06F 8/20* (2018.01)
   *G06F 11/36* (2006.01)

(52) U.S. Cl.
   CPC ......... *G06Q 10/06316* (2013.01); *G06F 8/20* (2013.01); *G06F 11/3608* (2013.01); *G06Q 10/063112* (2013.01)

(58) Field of Classification Search
   CPC .............................. G06Q 40/00; G06Q 40/06
   USPC ........................................................ 705/7.11
   See application file for complete search history.

(56) References Cited

U.S. PATENT DOCUMENTS

| | | | |
|---|---|---|---|
| 5,737,581 A * | 4/1998 | Keane | G06Q 99/00 703/6 |
| 6,601,233 B1 * | 7/2003 | Underwood | G06F 8/24 717/100 |
| 7,917,897 B2 | 3/2011 | Bassin et al. | |
| 8,244,570 B2 | 8/2012 | Nakazato | |
| 8,332,864 B2 * | 12/2012 | Bose | G06Q 10/10 718/106 |

(Continued)

FOREIGN PATENT DOCUMENTS

WO    2015128790 A1    9/2015

OTHER PUBLICATIONS

Yomi et al (A defect prediction method for software versioning), Dec. 2008, Software Qual J (2008) 16:543-562 (Year: 2008).*

*Primary Examiner* — Romain Jeanty
(74) *Attorney, Agent, or Firm* — Zilka-Kotab, P.C.

(57) ABSTRACT

A system, method, and computer program product are provided for resolving production business issues associated with a software product. In operation, a system identifies at least one business flow associated with at least one software product. The system identifies one or more defects associated with the at least one business flow. Further, the system maps the one or more defects to the at least one business flow. The system assigns at least one expert for evaluating the at least one business flow. The system analyzes the at least one business flow based on end-to-end business requirements. The system generates a generic resolution for the at least one business flow. The generic resolution includes a replacement business flow based on the end-to-end business requirements. Moreover, the system utilizes the generic resolution as a replacement for the at least one business flow in the at least one software product to resolve the one or more defects associated with the at least one business flow.

9 Claims, 6 Drawing Sheets

(56) References Cited

U.S. PATENT DOCUMENTS

| | | | |
|---|---|---|---|
| 9,268,674 B1* | 2/2016 | Ben-Cnaan | G06F 11/3688 |
| 2006/0015370 A1 | 1/2006 | Shen | |
| 2006/0271390 A1* | 11/2006 | Rich | G06F 8/20 |
| | | | 717/100 |
| 2008/0320486 A1* | 12/2008 | Bose | G06Q 10/06 |
| | | | 718/105 |
| 2011/0066557 A1 | 3/2011 | Bassin et al. | |
| 2011/0154372 A1* | 6/2011 | Niazi | G06Q 10/10 |
| | | | 719/320 |
| 2012/0130703 A1* | 5/2012 | Cutts | G06F 17/5009 |
| | | | 703/22 |
| 2013/0231973 A1 | 9/2013 | Kanuka et al. | |
| 2014/0136901 A1 | 5/2014 | Butler et al. | |
| 2015/0112663 A1* | 4/2015 | Cutts | G06Q 40/04 |
| | | | 703/22 |
| 2016/0224914 A1* | 8/2016 | Cutts | G06Q 40/04 |

* cited by examiner

SYSTEM, METHOD, AND COMPUTER PROGRAM FOR RESOLVING PRODUCTION BUSINESS ISSUES ASSOCIATED WITH A SOFTWARE PRODUCT

CLAIM OF PRIORITY

This application claims the benefit of U.S. Provisional Application Ser. No. 62/306,584, filed Mar. 10, 2016, the entire contents of which are incorporated herein by reference.

FIELD OF THE INVENTION

The present invention relates to software products, and more particularly to resolving business issues associated with such software products.

BACKGROUND

The maintenance of production software systems is a complicated service and people who are maintaining these production systems are not necessarily the people who have developed the software. While complexity has increased, the need for superior customer experience is still paramount, along with the need for accuracy, friendliness, and simplicity, the absence of which can negatively impact the Net Promoter Score (NPS) associated with an organization in social media, etc. Meeting one hundred percent of the key performance indicators (KPIs) can no longer be separated from maintaining critical business flows working end-to-end one hundred percent of the time.

All existing mechanisms for providing efficiency in solving defects or incidents associated with such production systems are currently limited to categorization or prioritizations to achieve quick reduction in the number of defects/incidents.

There is thus a need for addressing these and/or other issues associated with the prior art.

SUMMARY

A system, method, and computer program product are provided for resolving production business issues associated with a software product. In operation, a system identifies at least one business flow associated with at least one software product. The system identifies one or more defects associated with the at least one business flow. Further, the system maps the one or more defects to the at least one business flow. The system assigns at least one expert for evaluating the at least one business flow. The system analyzes the at least one business flow based on end-to-end business requirements. The system generates a generic resolution for the at least one business flow. The generic resolution includes a replacement business flow based on the end-to-end business requirements. Moreover, the system utilizes the generic resolution as a replacement for the at least one business flow in the at least one software product to resolve the one or more defects associated with the at least one business flow.

DETAILED DESCRIPTION

Figure 1:
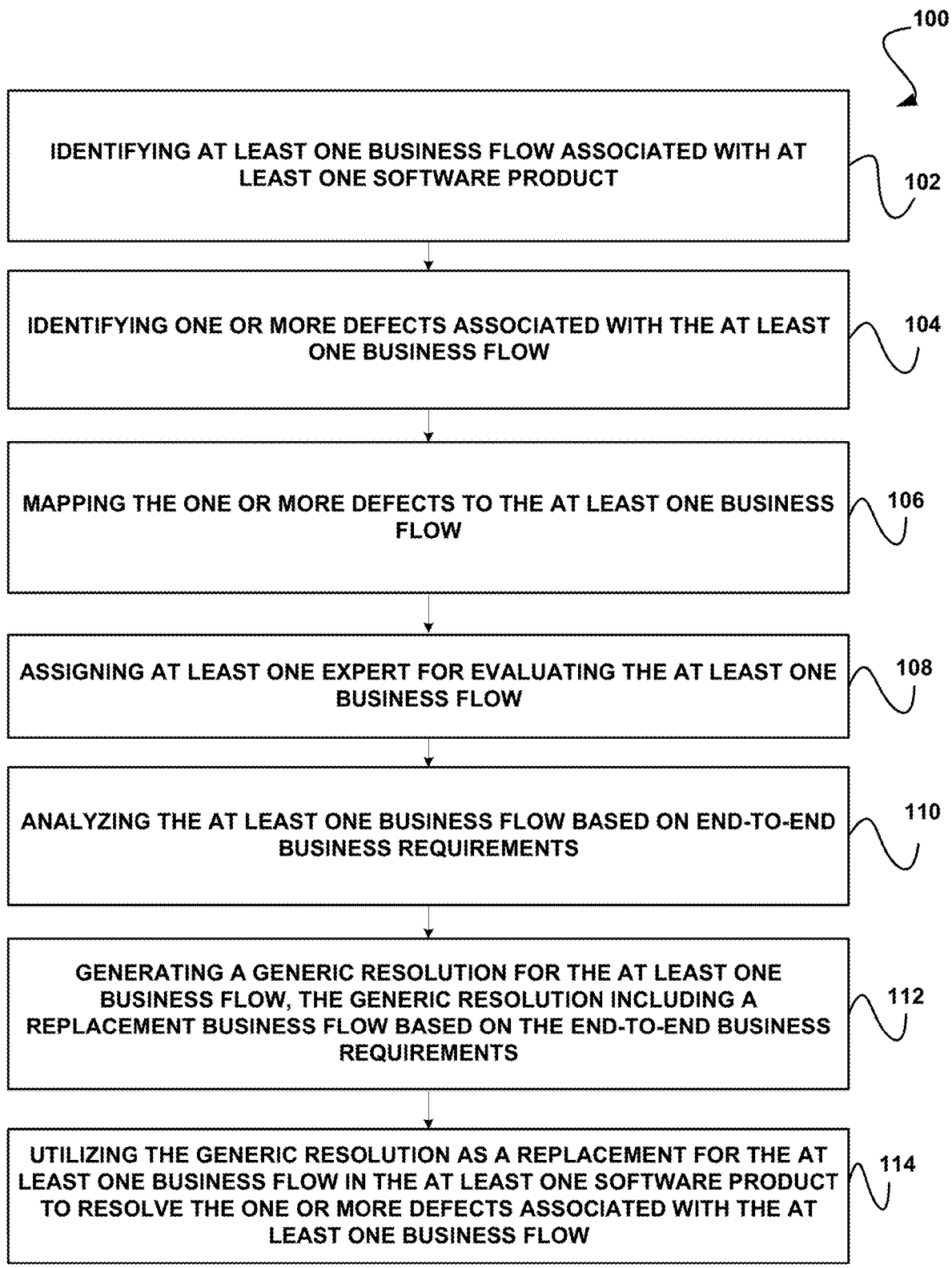
FIG. 1 illustrates a method for resolving production business issues associated with a software product, in accordance with one embodiment.

FIG. 1 illustrates a method 100 for resolution of production business issues associated with a software product, in accordance with one embodiment.

As shown, a system (e.g. a defect resolution system, etc.) identifies at least one business flow associated with at least one software product. See operation 102. The software product may be associated with any industry. For example, in one embodiment, the software product may be associated with the telecommunications industry.

The system may identify the business flows from various sources, including: product documentation from which the product was designed; solution detail design from which the customization to the product was performed; business flow documentation associated with the customer; and/or a combination of these sources, etc.

The system identifies one or more defects associated with the business flow. See operation 104. The defects may include any defect or incident associated with the business flow. In one embodiment, identifying the defects associated with the business flow may include identifying implementation agnostic patterns associated with the business flows that are capable of causing common incidents and defects areas across multiple product deployments.

The system automatically maps the defects to the business flow. See operation 106. In one embodiment, the system may use NLP (Natural Language Programing) to automatically map the defects and/or incidents to the business flows.

Further, the system automatically assigns at least one expert for evaluating the one business flow. See operation 108. In one embodiment, the system may receive results of the expert evaluation for subsequent use (e.g. via a user interface associated with the system, etc.).

The system analyses the business flow based on end-to-end business requirements. See operation 110. The end-to-end business requirements of the customer may be determined, for example, based on a Service Level Agreement (SLA), and/or Key Performance Indicators (KPIs), etc.

Moreover, the system generates a generic resolution for the at least one business flow. See operation 112. The generic resolution includes a replacement business flow based on the end-to-end business requirements. The generic resolution is generated based on the end-to-end business requirements of the customer, as opposed to being a solution that addresses individual defects, etc. In one embodiment, the system may generate the generic resolution based on feedback from the assigned expert. For example, the system may receive feedback and/or results of the evaluation from the expert (e.g. via a user interface, etc.) and use the feedback to generate the generic resolution.

The system utilizes the generic resolution as a replacement for the business flow in the software product to resolve the one or more defects associated with the at least one business flow. See operation 114.

The method 100 may be implemented by the system for resolution of business issues in production by focusing on fixing a broken end-to end-business flow in addition to complying with traditional SLAs/KPIs, which will enhance the end-to-end customer experience.

It should also be noted that the method 100 may be implemented utilizing various hardware, software, applications, user interfaces, etc., as dictated by the implementer. More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
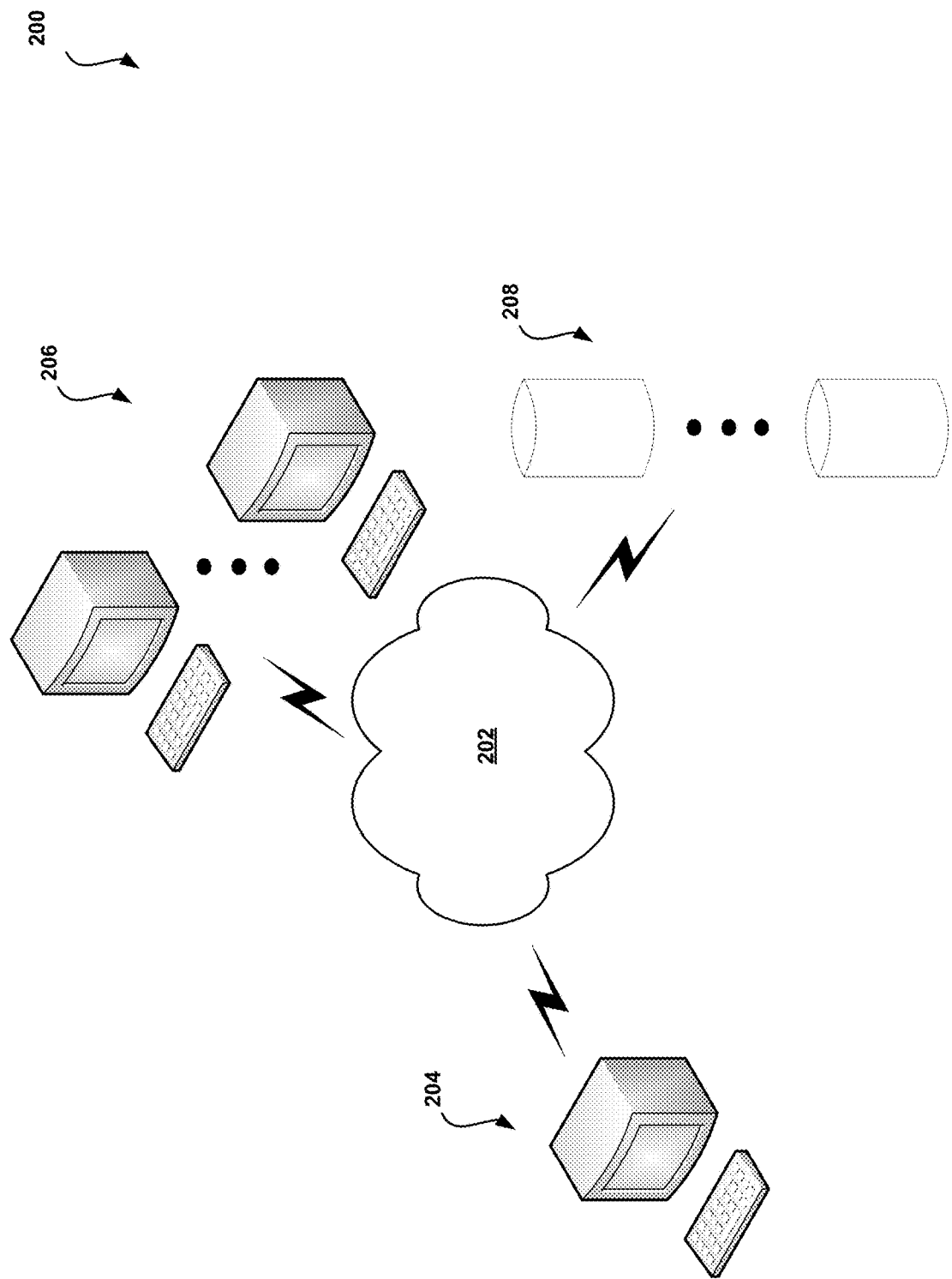
FIG. 2 shows a system for resolving production business issues associated with a software product, in accordance with one embodiment.

FIG. 2 shows a system 200 for resolution of production business issues associated with a software product, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a defect resolution system 204, which may implement a variety of applications or software, etc. The defect resolution 204 may be capable of communicating with a plurality of systems 206 (e.g. including a system utilized by an expert, etc.), either directly or over one or more networks 202, for resolution of production business issues associated with a software product.

The defect resolution system 204 may also be in communication with one or more repositories/databases 208, which may serve as a storage areas for software projects, etc., that the systems 206 may access. The defect resolution system 204 is operable for resolving production business issues associated with a software product and, in one embodiment, may implement the method 100 described in the context of FIG. 1.

The maintenance of production systems is a complicated service and people who are maintaining production systems are not necessarily the people who have developed the software. While complexity has increased, the need for superior customer experience is paramount, along with the needs for accuracy, friendliness, and simplicity, the absence of which can negatively impact the Net Promoter Score (NPS) in social media. Meeting one hundred percent of the key performance indicators (KPIs) can no longer be separated from maintaining critical business flows working end-to-end one hundred percent of the time.

In order to have positive customer experience, the defect resolution system 204 goes beyond regular defect analysis and prioritization to ensure business critical function/flow patterns of issues analyzed and reported are addressed for the entire business flow. Furthermore, the defect resolution system 204 is not restricted to solving the reported defects, but goes further to enhance the product as well as solutions to ensure the issue is never repeated in future.

To provide better experience to end users, the business flows are identified by defect resolution system 204, along with the critical business flows that impact the customer experience. When defects and incidents are reported by a customer to the defect resolution system 204, for example, instead of fixing individual incidents, the defect resolution system 204 emphasizes fixing the entire business flow. The defect resolution system 204 allocates the correct experts who may aid in fixing both reported and non-reported issues of an impacted critical business flow by supplementing fixes identified by the defect resolution system 204.

The indication of a broken business flow enables the ongoing service unit, testing unit, and product unit to focus on not only the issue reported, but to ensure the entire broken flow is analyzed and enhanced by the defect resolution system 204, and also ensures issues are never repeated in current or in future deployments. The indication of a broken business flow also acts as input to the readiness for upgrades.

A majority of efforts in the maintenance of production systems are spent fixing business flow issues that are documented by way of defects and incidents. Fixing these defects and incidents in production systems is the dominant work in the Managed Services business. Such services could be provided by in-house IT departments or outsourced Managed Services. Typically, the analysis focuses on aging of the defects and severity-priority combination.

Thousands of executive hours and millions of working hours are spent addressing incidents/defects, and even allocating hundreds of people to work on these issues still does not provide the desired customer experience. With changing business models and cost pressures, which will only increase in the future, there is zero leverage to continue with past models of marginal improvements. Therefore, there is a need of a much more advanced way of achieving the efficiencies that goes beyond the primitive way of individual defect handling to solve the customer business problem as a whole.

The defect resolution system 204 includes a framework to identify the problematic business flows derived from a set of defects with an aim to resolve the business flows instead of just myopic attention to individual defects.

With this approach, the incoming incidents/defects will be mapped to the business flows by the defect resolution system 204. The resultant fixing of the business flow will automatically take care of any incidents/defects in the flow. Therefore, there will be no need to fix individual incidents/defects.

In addition, the defect resolution system 204 may find implementation-agnostic patterns in areas of products and implemented solutions that typically lead to common incidents and defects areas across multiple deployments. This may be used to provide feedback to product and implementation teams to prevent future occurrences of such identified issues.

Since the entire business flow is sanitized with an attention to business requirements (versus individual defects), any unidentified issues will also be preemptively remedied.

Figure 3:
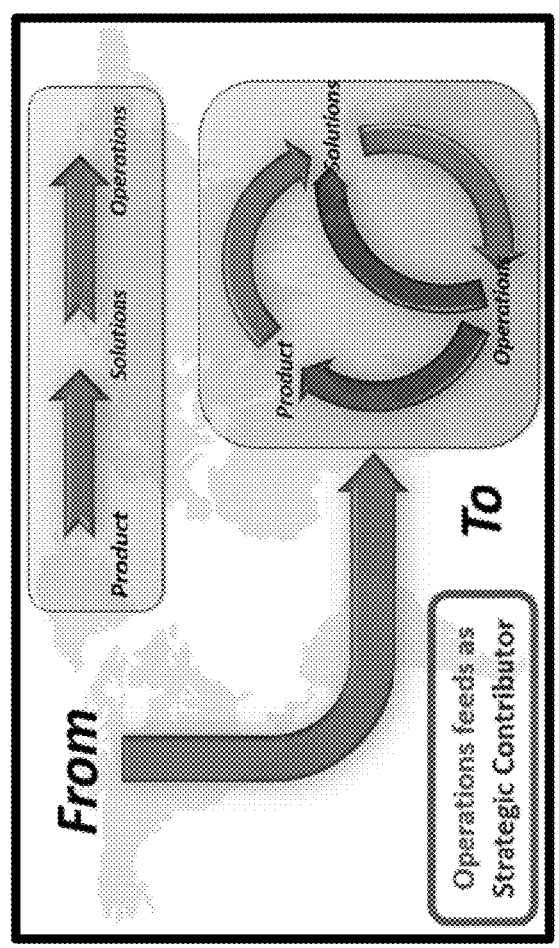
FIG. 3 shows a system flow describing how post production operations become a strategic contributor by providing feedback to product and solution teams, in accordance with one embodiment.

FIG. 3 shows a system flow 300 describing how post production operations become a strategic contributor by providing feedback to product and solution teams, in accordance with one embodiment. As an option, the system flow 300 may be implemented in the context of the details of the previous figures and/or any subsequent figure(s). Of course, however, the system flow 300 may be implemented in the context of any desired environment. Further, the aforementioned definitions may equally apply to the description below.

Figure 4:
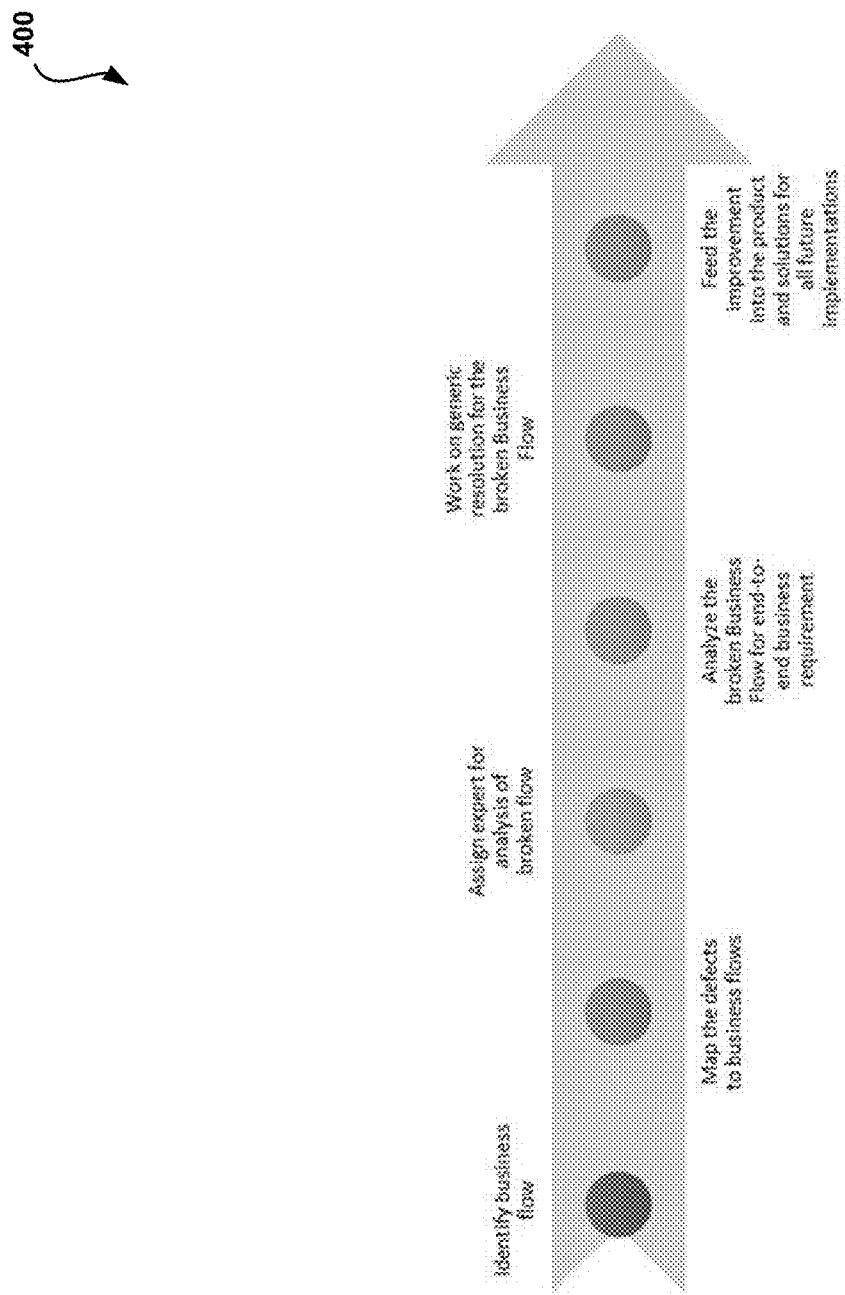
FIG. 4 shows operations implemented by a system for resolution of production business issues, in accordance with one embodiment.

FIG. 4 shows operations 400 implemented by a system for resolving production business issues, in accordance with one embodiment. As an option, the operations 400 may be implemented in the context of the details of the previous figures and/or any subsequent figure(s). Of course, however, the operations 400 may be implemented in the context of any desired environment. Further, the aforementioned definitions may equally apply to the description below.

As shown, the defect resolution system identifies a business flow. The defect resolution system implementation begins with detailed analysis and identification of various business flows for which an application is used. These business flows may be identified from various sources, such as: the product documentation based on which the product was designed; the solution detail design based on which the customization to the product was performed; business flow documentation associated with the customer; and a combination of these to create more combinations of the business flows to which various steps in the application belong. The business flows are documented in the defect resolution system.

The defect resolution system maps the defects to business flows. In this step, the reported issues (defects/incidents) are mapped to defined business flows. In one embodiment, the defect resolution system may also use NLP (Natural Language Programing) to automatically map the defects/incidents to business flows as a first step. NLP uses a learning system which identifies key words in the defects/incidents to map text to predefined business flow categories. Additionally, in one embodiment, the defect resolution system may start with a blank dictionary of key words and allow users to map the issues to business flows, allowing the system to learn from choices of business flows.

In another embodiment, an identified list of business flows may be uploaded into a system that is already in production. The defect resolution system may also guide the user each time the user looks for patterns or repeating words or phrases by indicating possible business flows to which the issues can be mapped.

In one embodiment, the defect resolution system may use an integration to an automation platform to trigger an automatic simulation of the identified business flows in order to confirm each identified business flow is impacted by the reported issues, thus ensuring the correct business flows were identified as impacted.

The defect resolution system also assigns an expert to potentially perform an analysis/evaluation of the broken flow. In this step, the defect resolution system may identify and allocate the correct expert, who may perform an analysis of the broken business flow. Such an expert needs to have understanding of a customer's business as well as business processes based on which product/solutions were designed.

A business flow may traverse multiple applications and different systems that could be internal and external. For the identification, in one embodiment, the defect resolution system may utilize a mapping matrix between experts and business flows or sub business flows in which the experts can support. The expert identified should have the knowledge of such touch points and interfaces among them. Therefore, such a person has to be carefully identified/allocated, as opposed to merely allocating a technical person.

Once the expert is identified, the defect resolution system may notify the expert of the allocated defects, their details, the business flows impacted, and the results of the simulations run for the business flows to properly present details gathered for the issues investigation. The defect resolution system may then analyze the broken business flow for end-to-end business requirements.

The expert may also analyze the broken business flow for end-to-end business requirements. For example, the expert allocated may perform the sanity check of the entire business flow and understand the way it needs to work. As part of this exercise, the expert may also aid in identifying all the areas that need to be fixed. These areas should have covered the reported defects/incidents as well as non-reported issues that can occur in different scenarios where the application can be used. In one embodiment, the expert may provide feedback and/or analysis to the defect resolution system (e.g. utilizing a user interface, etc.). In this case, the defect resolution system may utilize this feedback/analysis for analyzing the broken business flow for end-to-end business requirements.

The defect resolution system may utilize the results of the analysis to generate and/or identify generic resolutions for the broken business flow. In one embodiment, the expert may also work on generic resolutions for the broken business flow and provide input to the defect resolution system. All points of failures identified in the automated flow need to be fixed. While fixing such issues, the SLA/KPIs need to be considered by the defect resolution system for prioritization of the fixes in parallel with overall business flow evaluation.

After fixing the issues, the defect resolution system may use integration with an automation platform to simulate and validate the impacted business flows. The automation for the end-to-end flow will validate the entire flow is working, from beginning to the end. These predefined flows may be run by the defect resolution system to check business flows and make sure the issue impacting it is the only issue and that all issues are solved before releasing the fix to production. The defect resolution system may run this flow for multiple alternative scenarios and for end-state conditions to ensure no scenarios are left out.

Once the solution for the reported broken flows is developed, the details, the solution, and the future enhancement is input to the product unit and solutions unit for the future implementations. Information may also be provided to the core product and customization teams to assist in improving the quality of the product, solutions, and testing units to rollout incrementally cleaner systems in future, which tend to become more stable. The notification to involved parties may be sent manually or by the defect resolution system according to the development teams who contributed impacted code lines and the testing teams who previously reported defects for the impacted business flows during stages the product's lifecycle. A notification may also be sent by the defect resolution system to the owners of the reported issues to indicate the issue is resolved and business has returned to normal.

Thus, the defect resolution system framework operates to fix business flows holistically, leading to maximization of ease of business operations and superior end customer experience. This approach ensures that all the individual issues (defects/incidents) are fixed along with any future unidentified issues.

The service providing organization benefits by reduced work, thereby leading to higher profitability. The feedback to product and solutions units will ensure not only fixing the issues for a particular customer but also provide the rich customer experience across all future implementations. As a result, significant cost can be avoided by preventing occurrences of known issues.

The service provider also stands to gain high efficiencies due to a reduced number of errors in business flows/transactions. This ultimately leads to cost savings as well as additional revenues for the service providers.

This is a shift in the traditional mindset from resolving defects/incidents to giving priority to the business critical flows that enables rich customer experience and meeting one hundred percent KPIs/SLAs. Feedback from operations cultivates the practice and the culture of proactively taking care of business critical flows and underlying issues that can otherwise impact the customer experience.

Implementation of the defect resolution system also assists in developing the onboarding and learning plan for the experts by providing them exposure and training/OJT in the critical business flows.

All existing mechanisms to provide efficiency in solving defects or incidents are limited to efficient categorization or prioritizations to achieve quick reduction in number of defects/incidents. The defect resolution system framework takes a different approach by focusing on providing solutions/sanitization to fix the entire business flow versus fixing individual defects.

The defect resolution system implements a process where the main focus is to fix a broken business flow as a whole, as opposed to focusing on the individual defects, etc. The high volume defects and underlying issues are automatically fixed as a result. The defect resolution system also fixes any unidentified issues that have not been raised as defects. Broken business flow improvements may be plugged into products and solutions, which will prevent issues in any future implementations.

Unlike traditional solutions, the defect resolution system goes beyond maintaining a central database of issues and attempts to preempt the defects and incidents based on understanding of business flows. The main focus is to provide efficiency by fixing the business flow/transactions that reduce both existing defects, incoming defects, underlying issues, in addition to taking care of reported issues. Moreover, the defect resolution system goes beyond traditional solutions to enhance product and solutions that will prevent issues in any future implementations.

The defect resolution system includes a framework to incrementally eliminate all identified issues in given business flows in any future implementations. This unique system/solution provides the feedback to product and solutions units to ensure future implementations of same or similar business flows are stable and therefore improves customer experience. The defect resolution system provides qualitative understanding of business in addition to technical inputs.

Figure 5:
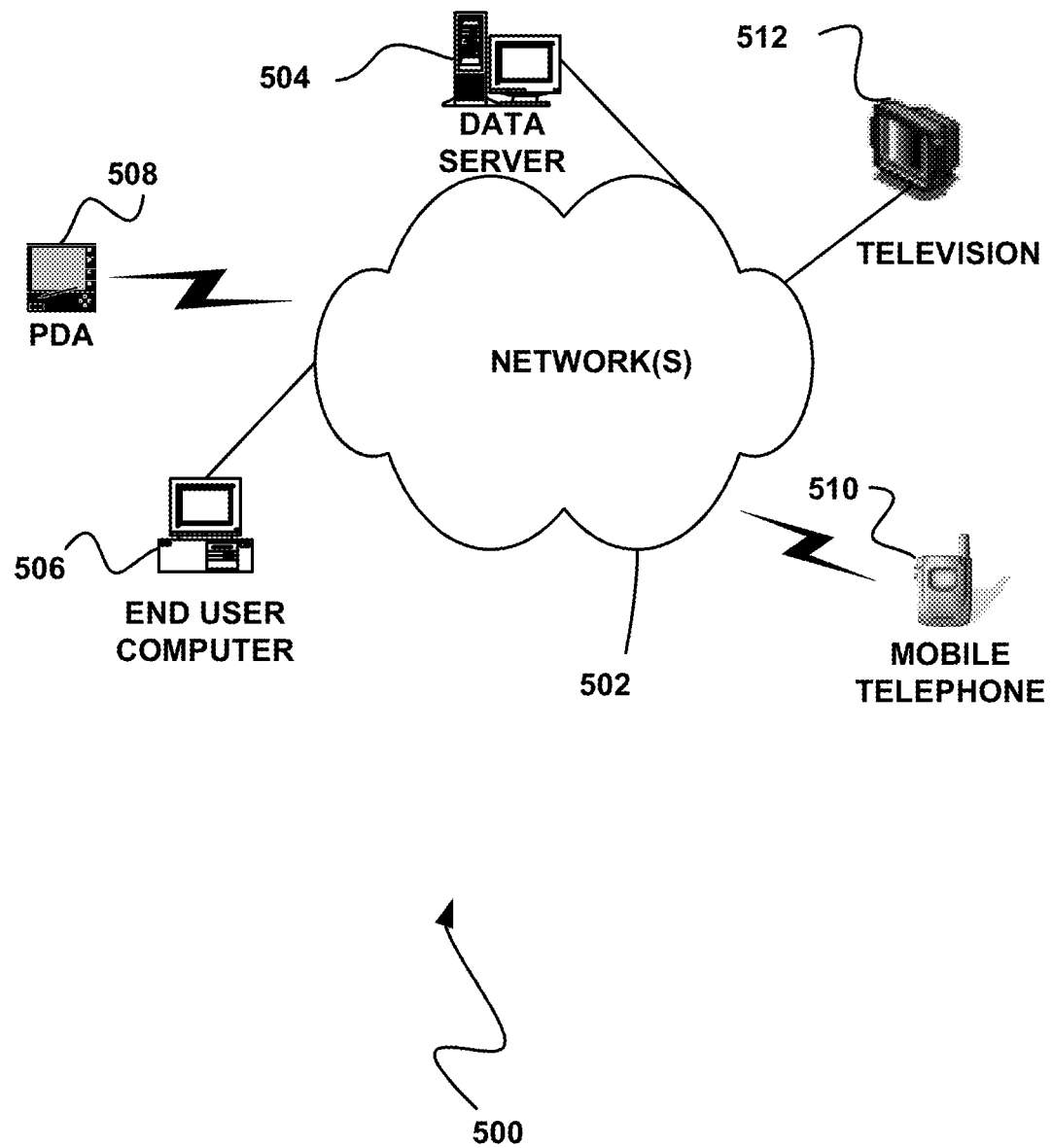
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
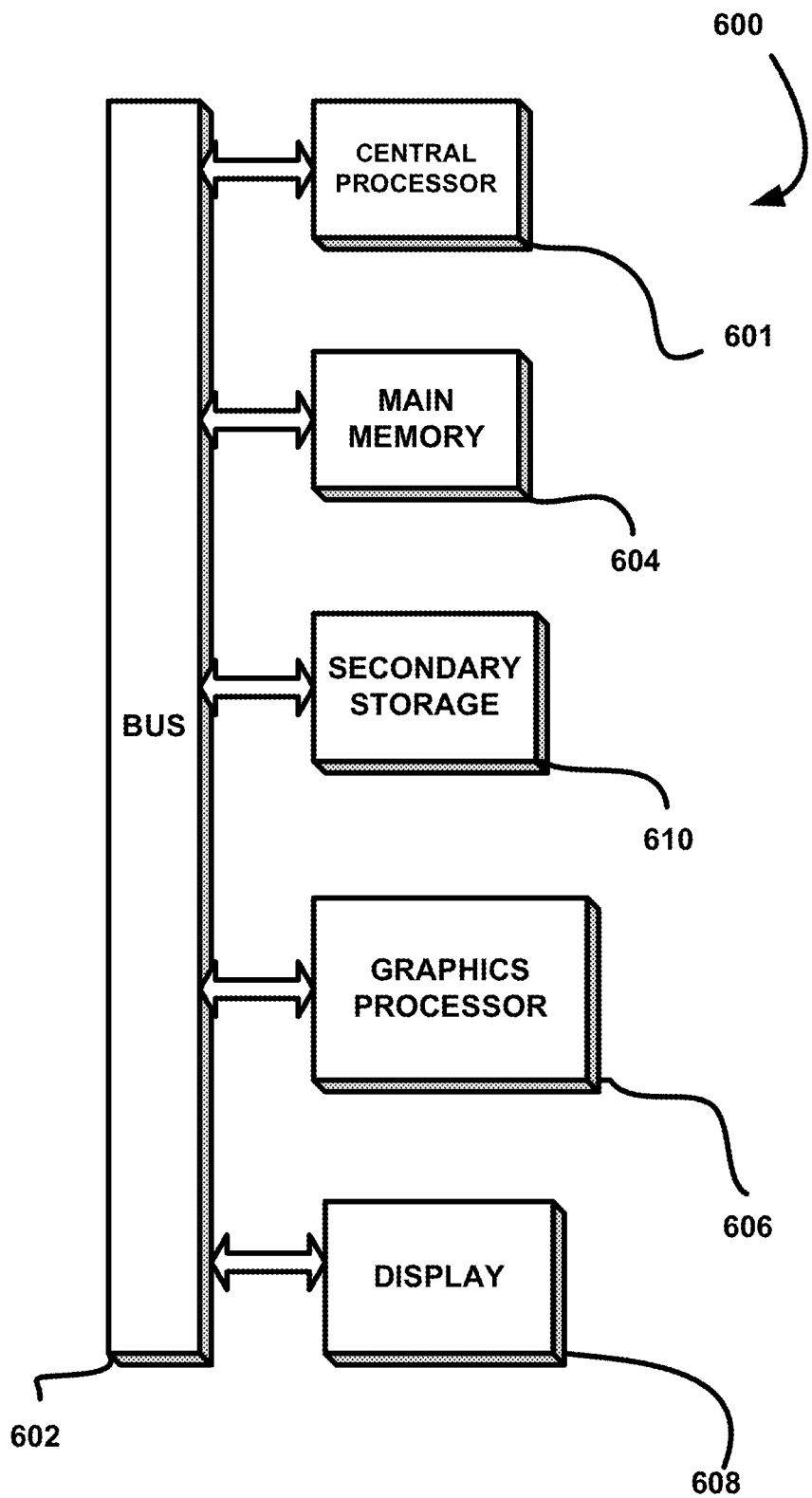
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying, by a system, having a computer processor and memory one or more defects associated with execution of a software product;
   mapping, by the system, the one or more defects to a business flow of the software product in which the one or more defects occurred, using natural language programming which identifies key words in the one or more defects and maps the key words to predefined business flow categories;
   triggering, by the system, a simulation of the business flow to confirm the business flow is impacted by the one or more defects;
   responsive to confirming the business flow is impacted by the one or more defects, assigning, by the system, at least one expert for evaluating the business flow;
   analyzing, by the system, the business flow for end-to-end business requirements;
   generating, by the system based on the evaluation by the expert, a replacement business flow that meets the end-to-end business requirements, wherein the replacement business flow is generated to replace the business flow as a whole without individually fixing each of the one or more defects in the business flow;
   simulating an entire flow of the software product, using the replacement business flow, to validate that use of the replacement business flow prevents the one or more defects from occurring;
   responsive to validating that the use of the replacement business flow prevents the one or more defects from occurring, causing, by the system, implementations of the software product to utilize the replacement business flow instead of the business flow to prevent the one or more defects from occurring during the implementations of the software product such that individual fixes in the business flow for each of the one or more defects are avoided.

2. The method of claim 1, wherein identifying the one or more defects associated with the business flow includes identifying one or more incidents associated with the business flow.

3. The method of claim 1, wherein identifying the one or more defects associated with the business flow includes identifying implementation agnostic patterns associated with the business flow that are capable of causing common incidents and defects across multiple product deployments.

4. The method of claim 1, wherein the business flow traverses multiple applications, and further comprising:
   causing, by the system, implementations of the multiple applications to utilize the replacement business flow instead of the business flow to prevent the one or more defects from occurring during the implementations of the multiple applications such that individual fixes in the business flow for each of the one or more defects are avoided for the multiple applications.

5. A computer program product embodied on a non-transitory computer readable medium, comprising computer code for:

identifying, by a system, one or more defects associated with execution of a software product;

mapping, by the system, the one or more defects to a business flow of the software product in which the one or more defects occurred, using natural language programming which identifies key words in the one or more defects and maps the key words to predefined business flow categories;

triggering, by the system, a simulation of the business flow to confirm the business flow is impacted by the one or more defects;

responsive to confirming the business flow is impacted by the one or more defects, assigning, by the system, at least one expert for evaluating the business flow;

analyzing, by the system, the business flow for end-to-end business requirements;

generating, by the system based on the evaluation by the expert, a replacement business flow that meets the end-to-end business requirements, wherein the replacement business flow is generated to replace the business flow as a whole without individually fixing each of the one or more defects in the business flow;

simulating an entire flow of the software product, using the replacement business flow, to validate that use of the replacement business flow prevents the one or more defects from occurring;

responsive to validating that the use of the replacement business flow prevents the one or more defects from occurring, causing, by the system, implementations of the software product to utilize the replacement business flow instead of the business flow to prevent the one or more defects from occurring during the implementations of the software product such that individual fixes in the business flow for each of the one or more defects are avoided.

6. The computer program product of claim 5, wherein identifying the one or more defects associated with the business flow includes identifying one or more incidents associated with the business flow.

7. The computer program product of claim 5, wherein identifying the one or more defects associated with the business flow includes identifying implementation agnostic patterns associated with the business flow that are capable of causing common incidents and defects across multiple product deployments.

8. A system comprising one or more processors operable for:

identifying, by the system, one or more defects associated with execution of a software product;

mapping, by the system, the one or more defects to a business flow of the software product in which the one or more defects occurred, using natural language programming which identifies key words in the one or more defects and maps the key words to predefined business flow categories;

triggering, by the system, a simulation of the business flow to confirm the business flow is impacted by the one or more defects;

responsive to confirming the business flow is impacted by the one or more defects, assigning, by the system, at least one expert for evaluating the business flow;

analyzing, by the system, the business flow for end-to-end business requirements;

generating, by the system based on the evaluation by the expert, a replacement business flow that meets the end-to-end business requirements, wherein the replacement business flow is generated to replace the business flow as a whole without individually fixing each of the one or more defects in the business flow;

simulating an entire flow of the software product, using the replacement business flow, to validate that use of the replacement business flow prevents the one or more defects from occurring;

responsive to validating that the use of the replacement business flow prevents the one or more defects from occurring, causing, by the system, implementations of the software product to utilize the replacement business flow instead of the business flow to prevent the one or more defects from occurring during the implementations of the software product such that individual fixes in the business flow for each of the one or more defects are avoided.

9. The system of claim 8, wherein identifying the one or more defects associated with the business flow includes identifying one or more incidents associated with the business flow.

\* \* \* \* \*